United States Patent Office 3,384,623
Patented May 21, 1968

3,384,623
PRODUCTION OF POLYURETHANE
ELASTOMERS
Katsumi Inoue, Toshimi Matsui, Ikuo Suyama, and Hiroaki Masuda, Tsuruga, Japan, assignors to Toyo Spinning Co., Ltd., Osaka, Japan
No Drawing. Filed Dec. 31, 1964, Ser. No. 422,542
Claims priority, application Japan, Jan. 11, 1964,
39/1,090
5 Claims. (Cl. 260—75)

ABSTRACT OF THE DISCLOSURE

The present invention provides for a process for preparing a spinnable solution of a linear elastic polyurethane comprising:

(A) Forming an isocyanate-terminated prepolymer by reacting at an elevated temperature (i) an organic diisocyanate, (ii) a hydroxyl-terminated difunctional polyol having a molecular weight between about 600 and 4,000, and (iii) between about 0.05% and 5%, based on the weight of the prepolymer of a monohydric alcohol containing as its sole group, reactive with an isocyanate group, one hydroxyl group;

(B) Forming a prepolymer solution by dissolving between 15 and 50 parts of prepolymer (A) in 50 to 85 parts of a solvent which is inert to the isocyanate group and which will dissolve the linear polyurethane;

(C) Adjusting the temperature of solution (B) to within the range of about 0° C. up to about 100° C., and (D) Forming a spinnable solution by adding to solution (C) a difunctional chain-extender which is capable of reacting with said prepolymer (A).

---

This invention relates to improvements in the production of spinnable or elastic yarn forming solutions of linear polyurethane elastomers.

Recent years have witnessed a phenomenal growth in polyurethane industry and the demand for elastic yarn is also expanding rapidly. The basic method of producing urethane polymers comprises, as a rule, reacting an intermediate prepolymer having terminal isocyanate groups with a bifunctional hydro-compound. However, unlike the production of well known foam rubber and the like, it is impossible to spin out elastic filaments (so-called "spandex" filaments or yarns) continuously and uniformly unless a stable and homogeneous linear urethane polymer elastomer solution is prepared in the first place. Thus, whereas the final object is gelling or attaining a three-dimensional arrangement so far as the production of foam rubber of urethane polymers is concerned, gelling is not only intrinsically rather undesirable but makes it impossible to manufacture elastic yarns on a commercial scale when the spinning of a linear elastomer solution is attempted.

As regards the reaction for forming urethane polymers, it is well known that certain metal salts, alkalis, amines, and other catalysts accelerate the gelling reaction. Even in very small amounts, these catalysts promote cross-linking. Thus, the presence of an extremely small amount as low as 0.1 percent or 1 p.p.m. of such a catalyst will often be found to have a strong catalytic action. It is indispensable, therefore, to remove such trace impurities or catalytic substances in order to prepare a satisfactory linear elastomer solution for forming elastic filaments. Unfortunately, however, it is quite difficult to remove such a trace amount of impurities by ordinary purification procedures. It frequently happens that such impurities are contained in the spinning solution in amounts which cannot be chemically analyzed quantitatively, and it is difficult to control the degree of the starting materials to be used in the production of the spinning solution.

Therefore an object of this invention is to prevent undesired gelling of the linear polymer solution.

Another object is to improve the yarn-forming properties of the solution of a spandex polymer.

Still another object is to provide for a more uniform distribution of the degree of polymerization of polyurethan elastomers.

Other objects, features and advantages of this invention will be clear from the following detailed description.

A spinnable linear urethane polymer elastomer solution is generally prepared by reacting a polyglycol having terminal hydroxyl, e.g. polyethers, polyesters, polyether esters, polyester amides, etc., with an excess of an organic diisocyanate to produce an intermediate prepolymer having terminal isocyanate radicals and treating the same with a chain-extender in solution in a suitable organic solvent to extend the molecular chain.

Such methods of producing these elastic polymer solutions are very well known in the art and have been described in many patents, among which may be mentioned, for example, U.S. Patent No. 2,929,804, No. 2,957,852 and No. 3,111,368, and German Patent No. 1,123,467. Therefore, and since the general method of the production of prepolymer and its chain extension to form a spinning solution of an elasitc polymer does not constitute a novel feature of this invention, no further detailed explanation thereabout will be necessary except explaining a preferred mode of working of the invention as follows. The only and most important feature of this invention is to add a mono-functional alcohol to the reaction system before or during the prepolymer forming reaction in the process of the production of elastic polymer solution which may be known per se as mentioned above.

A preferred mode of embodying the present invention comprises, in the first place, reacting a polyglycol which have a molecular weight of 600 to 4000 and terminal hydroxyl radicals, e.g., a polyether glycol, a polyester glycol, a polyether-ester glycol, a polyester-amide glycol, etc., with an excess amount (preferably about 1.5 to 2.5 times moles per mole of said polglycol) of an organic diisocyanate, preferably an aromatic diisocyanate, at elevated temperatures, preferably, at 50° C. to 100° C., so that the hydroxyl radicals at the ends of said polyglycol may react with the isocyanate radicals to yield an intermediate prepolymer which has isocyanate radicals at both ends. As a second step, the resulting intermediate polymer is dissolved in a solvent which is inert to isocyanate radical and capable of dissolving the final polymer to be formed to prepare a prepolymer solution of a concentration of about 15 and 50 percent. This invention consists in the addition of a monofunctional alcohol, which preferably is a monohydric alcohol having twenty or less (more preferably 2-8) carbon atoms and has a hydroxyl radical directly attached to the aliphatic carbon chain to the starting materials to be used in the production of said intermediate prepolymer or in the course of the prepolymer forming reaction. The amount of said alcohol is 0.05 to 5.0 weight percent and within 0.5 to 10 mole percent (more preferably, 0.05 to 1.0 weight percent, 0.5 to 4 mole percent) based on the intermediate prepolymer that will be formed.

The prepolymer solution is then adjusted to the temperature that will be suitable for the particular chain extender to be used, e.g., below 0° C. up to about 100° C. and said chain extender is added gradually or at one time to the prepolymer solution to cause the linear chain extending reaction. The solution of linear elastomeric polymer obtained upon the chain extension as above may be spun into elastic filaments or yarns by well known conventional dry or wet-spinning, or, alternatively, extruded into sheets or films. It may also be applied in many other uses, inclusive of coating fabrics or non-woven cloths. It also falls within the scope of this invention to chemically spin the above intermediate prepolymer in the solution of a chain extender.

The polyglycols which may be generally employed in the method of this invention are those polyglycols having hydroxyl radicals at both ends, which may be exemplified by polyoxy-1,2-propylene glycol, polyoxy-1,2-butylene glycol, polyoxy-2,3-butylene glycol, ethylene glycol-propylene glycol copolymer, polyoxytetramethylene glycol, polyoxyalkylene glycol-thioglycol copolymer, and other polyether glycols, the ternary copolymer polyglycols of polyether glycol and dicarboxylic acid, and polyester glycol. These polymerized glycols preferably have a molecular weight of 600 o 4000, a hydroxyl value of 30 to 185, and an acid value of 1 or less. The organic diisocyanates which may be employed in the invention are preferably aromatic diisocyanates, such as methylene-bis-4-phenyl isocyanate, 2,4-tolylene diisocyanate, 2,6-tolylene diisocyanate, 1,5-naphthylene diisocyanate, m-xylene diisocyanate, p-xylene diisocyanate, and the like.

The chain-extender may be conventional bifunctional compounds having active hydrogen atoms, such as hydrazine, diamine, glycol, amino-alcohol, water, boric acid, carbodihydrazide, dicarboxylic-dihydrazide, etc. In case of diamines, it is preferable to use lower alkylene diamines containing a side chain alkyl group which contains from one to three carbon atoms, such as 1,2-propylene diamine, 2,3-butylene diamine, etc.

The above-mentioned polyglycols usually contain impurities which would promote gelling during the urethane reaction and it is also possible that a branching reaction takes place as a side reaction in the course of the preparation of an intermediate prepolymer.

We have found that by adding a monofunctional alcohol before or during the prepolymer forming reaction, the undesirable gelling during not only the production of a linear elastomer but also in the process of producing the intermediate prepolymer is prevented and the chain-extending reaction is conducted smoothly and uniformly under controlled conditions.

More particularly, the present invention is directed to a process for preparing a spinnable solution of a linear elastic polyurethane comprising:

(A) Forming an isocyanate-terminated prepolymer by reacting at an elevated temperature (i) an organic diisocyanate, (ii) a hydroxyl-terminated difunctional polyol having a molecular weight between about 600 and 4,000, and (iii) between about 0.05% and 5%, based on the weight of the prepolymer of a monohydric alcohol containing as its sole group, reactive with an isocyanate group, one hydroxyl group;

(B) Forming a prepolymer solution by dissolving between 15 and 50 parts of prepolymer (A) in 50 to 85 parts of a solvent which is inert to the isocyanate group and which will dissolve the linear polyurethane;

(C) Adjusting the temperature of solution (B) to within the range of about 0° C. up to about 100° C., and (D) Forming a spinnable solution by adding to solution (C) a difunctional chain-extender which is capable of reacting with said prepolymer (A).

The monofunctional alcohols which may be employed according to this invention include, for example, monohydric alcohols such as methanol, ethanol, propanol, isopropanol, butanol, isobutanol, secondary butylalcohol, tertiary butyl alcohol, n-amyl-alcohol, isoamyl alcohol, tertiary amylalcohol, n-hexyl alcohol, cyclohexanol, octyl alcohol, capryl alcohol, decyl alcohol, lauryl alcohol, myristyl alcohol, cetyl alcohol, stearyl alcohol, allyl alcohol, oleoyl alcohol, benzyl alcohol, etc., polyalkyleneetherglycol monoester, the fatty acid monoesters of polyester glycol, monoalkyl ethers which preferably are the monoacetates, monomyristates, monopalmitates, monostearates, monoethyl ethers, monopropylethers of polyethylene glycol, polypropylene glycol, polyoxytetramethylene glycol, etc., the molecular weights of which range from 200 to 3000.

While the mechanism of the action of the above-mentioned monofunctional alcohols has not yet been ascertained, they apparently control the branching reaction which takes place incidentally during the formation of said intermediate polymer and, also, exert an inhibitory action on the tendency to gel in the course of reaction of the chain-extender and said intermediate prepolymer. The alcohols are also capable of controlling or suppressing cross-linking and allowing the reaction to be uniformly proceeded, giving rise to an excellent spinnable polymer solution. The above-mentioned alcohols also exhibit excellent properties even when they are added to starting material composition which are highly liable to gel, and the materials which cannot be utilized because of its extensive gelling in the absence of such alcohols may be successfully reacted according to the invention. It is, thus, presumed that said alcohols control the velocities of the reaction, inhibit the local evolution of heat, and, accordingly, prevent cross-linking.

The above-mentioned alcohols may be added to the starting materials, or in the course of the reaction leading to the production of an intermediate polymer.

The intermediate prepolymer mentioned above is polymerized or subjected to a chain-extending reaction in a liquid phase with a chain-extender in the presence of a solvent, such as dimethyl acetamide, dimethyl formamide, dimethyl sulfoxide, tetrahydrofuran, etc., the concentration of said solution ranging from 15 to 50%. In order to prepare elastic filaments or yarns from the polymer solution obtainable as above, the solution may be wet-spun through a nozzle in a warm aqueous bath at about 50°–90° C., or, more preferably, dry-spun in air streams at about 150°–350° C. The shaped elastic filaments obtained as above may be after-treated in the conventional manner. The final products are superior to the conventional elastic yarns manufactured without the employment of monofunctional alcohols, in mechanical strength, elongation, and other properties. Thus, with all the troubles that usually arise from gelling in the course of production entirely eliminated, the production of elastic or spandex yarns has now been much facilitated and rendered highly stable.

This invention will be further described in detail by way of the following examples, in which all parts are by weight unless otherwise specified.

Example 1

A mixture of 10 parts of methylene-bis-(4-phenylisocyanate) 17 parts of poly-1,2-propylene oxide glycol (molecular weight: 850), and 0.1 part of secondary butyl alcohol was allowed to reaction at 90° C. for 60 minutes. The resulting intermediate prepolymer having terminal isocyanate radicals on both ends was thoroughly dissolved in 40 parts of dimethylformamide. While the solution is stirred under cooling with ice, a solution of 1.7 parts of 2,3--butylene diamine in 20 parts of dimethylformamide was added, whereby a highly homogeneous polymer solution was obtained as the solution increased in viscosity. On the other hand, when a similar polymerization reaction is conducted in the absence of secondary butyl alcohol, there were observed no abnormalities in the formation of the intermediate prepolymer but a slight gelling took place in the course of the chain-extending reaction.

The yarn-forming properties of the above two polymer solutions were determined by dipping a needle of stainless steel having a diameter of 1.5 mm. in each solution to a depth of 5 mm. and lifting the needle out of the solution into an atmosphere having the saturated vapor pressure of dimethylformamide at 20° C. at the rate of 60 cm. per minute.

|  | Secondary butyl alcohol added | Control |
|---|---|---|
| Yarn-forming properties | 30 cm. or up | 4 cm. |

Example 2

A mixture of 4 moles of diethyl adipate, 1 mole of polyoxypropylene glycol (molecular weight: 700), 10 moles of ethylene glycol, and 0.002 mole of zinc acetate was subjected to an ester exchange reaction at 170° C. After ethanol has been distilled out, the mixture was further heated to 240° C. under reduced pressure for 5 hours or until a predetermined amount of ethylene glycol was distilled out. The resulting hydroxy-polyester having a molecular weight of 2050, an acid value of 0.2 and a hydroxyl value of 54.6 was polymerized under the following conditions.

Two moles of methylene-bis-4(phenylisocyanate), 1 mole of the above obtained hydroxy-polyester (molecular weight: 2050), and 0.01 mole of n-amyl alcohol were allowed to react at 80° C. for 60 minutes to obtain an intermediate prepolymer. The prepolymer prepared as above was dissolved in dimethylformamide and, under cooling with ice, the solution was subjected to a chain-extending reaction in the presence of 1,2-propylene diamine. The 25% polymer solution prepared as above had a viscosity of 900 poises. The yarn-forming properties of the solution were determined in the same manner as Example 1. On the other hand, a similar product obtained without adding n-amyl alcohol in the course of preparation of the intermediate polymer was also subjected to a chain-extending reaction under the same conditions as above to prepare a 25% polymer solution of 950 poises. The yarn-forming properties of the above two solutions and properties of the yarns obtained were compared with each other. Spinning conditions: The filaments were taken up at the rate of 150 m. per minute in a hot air at 200° C.

|  | n-Amyl alcohol | Control |
|---|---|---|
| Yarn-forming properties, cm | 16.5 | 6.0 |
| Yarn qualities: |  |  |
| Strength, g./d | 0.78 | 0.72 |
| Elongation, percent | 650 | 500 |

Example 3

Two moles of methylene-bis-(4-phenylisocyanate) and 1 mole of polyoxytetramethylene glycol (molecular weight: 1040) were allowed to react at 80° C. for 30 minutes so as to prepare an intermediate prepolymer. The intermediate prepolymer was dissolved in dimethylformamide and the solution cooled with ice to 0° C. A solution of hydrazine hydrate in dimethylformamide was added to the above prepolymer solution, whereupon gelling took place so extensively that the reaction could not be continued any further. The yarn-forming properties of the intermediate prepolymer could not be determined. On the other hand, a similar prepolymer solution prepared by adding 0.5% of n-butanol (based on the weight of the intermediate prepolymer to be formed) in the course of the formation of said intermediate polymer undergoes a satisfactory chain-extending reaction and, accordingly, led to a very satisfactory yarn-forming polymer solution. Another intermediate prepolymer prepared by addition of 2% of the monolauryl other of polyoxyethylene glycol (molecular weight: 400) in place of n-butanol also resulted in satisfactory yarn-forming polymer solution.

|  | Control | n-Butanol added | Monolauryl ether of polyoxyethylene glycol added |
|---|---|---|---|
| Yarn-forming properties | Not determinable | 25 cm | 31 cm. |
| Spinnability | Not spinnable | Good | Good. |

Example 4

0.5 mole of diethyl adipate, 1 mole of ethylene glycol, and 0.001 mole of zinc acetate were allowed to react so as to prepare a polyester glycol having a molecular weight of 1450, an acid value of 0.4 and a hydroxyl value of 77. 290 grams of the polyester glycol was reacted with 100 grams of diphenylmethane-4,4-diisocyanate at 90° C. for 40 minutes, and an intermediate prepolymer was obtained. When the intermediate prepolymer was subjected to a chain-extending reaction in the same manner as Example 1, a partial gelling took place. However, when 0.4% of propyl alcohol was added in the course of the preparation of the intermediate prepolymer, there occurs no gelling at all in the chain-extending reaction. A 20% solution of the elastic polymer was extruded in an aqueous bath at 80° C. and taken up at the rate of 20 m. per minute, followed by treatment with boiling water. The yarn qualities of the above two products are summarized as follows.

| Yarn qualities | Control | Propyl alcohol added |
|---|---|---|
| Strength, g./d | 0.73 | 0.85 |
| Elongation, percent | 520 | 715 |

Example 5

Ten parts of methylene-bis-(4-phenylisocyanate) and 20 parts of polyoxytetramethylene glycol (molecular weight: 1030) were allowed to react at 80° C. for 30 minutes to prepare an intermediate prepolymer. After cooling, the prepolymer was dissolved in 50 parts of dimethylformamide, followed by further cooling. Then, a solution of 1.4 parts of 1,2-propylene-diamine in 15 parts of dimethylformamide was gradually added to the above prepolymer solution and the mixture was allowed to react with vigorous stirring for about 15 minutes, at the end of which time a viscous solution was obtained. On the other hand, a similar solution was prepared by adding about 0.3% of n-butanol in the course of formation of the intermediate prepolymer. These 20% polymer solutions having about 500 poises were then evaluated for their yarn-forming properties and qualities of yarns obtained therefrom. Determination of the yarn-forming properties was conducted under the conditions described in Example 1. These polymer solutions were extruded in hot air stream at 200° C. and taken up at the rate of 150 m. per minute. The resulting filaments were after-treated in the conventional manner.

|  | Control | n-Butanol |
|---|---|---|
| Yarn-forming properties, cm | 1.2 | 30 |
| Yarn qualities: |  |  |
| Strength, g./d | 0.83 | 1.02 |
| Elongation, percent | 490 | 580 |

What we claims is:

1. A process for preparing a spinnable solution of a linear elastic polyurethane comprising:
   (A) forming an isocyanate-terminated prepolymer by reacting at an elevated temperature (i) an organic diisocyanate, (ii) a hydroxyl-terminated difunctional polyol having a molecular weight about 600 and 4,000, and (iii) between about 0.05% and 5%, based on the weight of the prepolymer, of a monohydric alcohol containing as its sole group, reactive with an isocyanate group, one hydroxyl group;
   (B) forming a prepolymer solution by dissolving between 15 and 50 parts of prepolymer (A) in 50 to 85 parts of a solvent which is inert to the isocyanate group and which will dissolve the linear polyurethane;

(C) adjusting the temperature of solution (B) to within the range of about 0° C. up to about 100° C., and (D) forming a spinnable solution by adding to solution (C) a difunctional chain-extender which is capable of reacting with said prepolymer (A).

2. A method as claimed in claim 1 wherein the monohydric alcohol is added before or during the prepolymer forming reaction.

3. A method as claimed in claim 1 wherein the monohydric alcohol is added in an amount of 0.05–1 % by weight based on the prepolymer to be formed.

4. A method as claimed in claim 1 wherein the monohydric alcohol is selected from those having an aliphatc carbon chain of not more than 20 carbon atoms.

5. A method as claimed in claim 4 wherein the aliphatic carbon chain has 2–8 carbon atoms.

References Cited

UNITED STATES PATENTS

| | | | |
|---|---|---|---|
| 2,929,804 | 3/1960 | Steuber | 260—77.5 |
| 3,012,993 | 12/1961 | Rogan | 260—77.5 |
| 3,100,759 | 8/1963 | Boussu et al. | 260—77.5 |
| 3,135,711 | 6/1964 | Thoma et al. | 260—30.4 |
| 3,189,578 | 6/1965 | Kuemmerer | 260—77.5 |
| 3,350,361 | 10/1967 | Chandley et al. | 260—77.5 |

FOREIGN PATENTS

| | | |
|---|---|---|
| 1,012,644 | 12/1965 | Great Britain. |
| 1,042,830 | 9/1966 | Great Britain. |
| 1,102,385 | 3/1961 | Germany. |
| 1,375,793 | 9/1964 | France. |
| 917,450 | 2/1963 | Great Britain. |

DONALD E. CZAJA, *Primary Examiner.*

F. McKELVEY, *Assistant Examiner.*